US008626613B2

(12) United States Patent
Dale et al.

(10) Patent No.: US 8,626,613 B2

(45) Date of Patent: Jan. 7, 2014

(54) PEGBOARD STOCKING AND RESETTING SYSTEM

(75) Inventors: Ernest J. Dale, Waterford, VA (US); Alastair J. Gregory, Herndon, VA (US); Berin C. Loritsch, Leesburg, VA (US); Willis S. Duncan, Haymarket, VA (US); Robert Dale, Chapel Hill, NC (US)

(73) Assignee: Information Planning & Management Service, Inc., Sterling, VA (US)

( * ) Notice: Subject to any disclaimer, the term of this patent is extended or adjusted under 35 U.S.C. 154(b) by 2618 days.

(21) Appl. No.: 10/340,290

(22) Filed: Jan. 10, 2003

(65) Prior Publication Data

US 2004/0135364 A1 Jul. 15, 2004

(51) Int. Cl.
*G06Q 10/00* (2012.01)
*G09F 3/18* (2006.01)

(52) U.S. Cl.
USPC .......................................... 705/28; 40/661.03

(58) Field of Classification Search
USPC ........................................................... 705/28
See application file for complete search history.

(56) References Cited

U.S. PATENT DOCUMENTS 4,378,884 A * 4/1983 Anderson .................. 206/459.5
4,531,313 A * 7/1985 Fast ................................ 40/657
5,165,316 A * 11/1992 Hayes ........................ 83/522.17
5,383,111 A * 1/1995 Homma et al. ................. 705/27
5,651,852 A * 7/1997 Mitchell et al. ............... 156/252
6,473,984 B1 * 11/2002 Splain et al. .................... 33/613
7,191,951 B2 * 3/2007 Hanyu et al. .................. 235/486
2002/0167500 A1 * 11/2002 Gelbman ...................... 345/204
2003/0200129 A1 * 10/2003 Klaubauf et al. ................. 705/8

OTHER PUBLICATIONS

Spaceman, pp. 1-24. Downloaded from http://web.archive.org/web/20030212182913/acnielsen.com/products/tools/spaceman.pdf and selecting the Select Quick Start Guide on Jun. 19, 2008.*
SpacemanStoreSuite, p. 1. Downloaded from http://web.archive.org/web/20000818193729/www.acnielsen.com/download/pdf/sales/spacemanstoresuite.pdf on Jun. 19, 2008.*
ShelfBuilder, p. 1. Downloaded from http://web.archive.org/web/20030325112935/www.nielsen.com/download/pdf/brochure/shelfbuilder.pdf on Jun. 19, 2008.*
Spaceman_Pro_FAQ, pp. 1-3. Downloaded from http://web.archive.org/web/20030220191442/www.acnielsen.com/products/tool/spaceman/pro/faq.htm on Jun. 19, 2008.*

(Continued)

*Primary Examiner* — Paul Danneman
(74) *Attorney, Agent, or Firm* — Pillsbury Winthrop Shaw Pittman LLP

(57) ABSTRACT

Methods and apparatuses for making a stocking strip for pegboard stocking. The stocking strip includes an elongated strip containing information for locating a plurality of different products on a peg board display, a first identification number for identifying the strip, a first text area for identifying a source planogram or print job, a second text area for listing stocking location in a sales establishment which contains the pegboard display, a third text area for listing a height for the product, a demarcation for indicating a span of the position of the product on the pegboard, a product image, a product identifier, a color marker and a peg indicator for locating the peg on the pegboard display.

17 Claims, 7 Drawing Sheets

(56) References Cited

OTHER PUBLICATIONS

NPL__Shelf__Builder, Compilation of Announcement, downloaded from http://connection.ebscohost.com/contentarticle/1031301849.html?view=print and Shelf Builder, downloaded from http:/web.archive.org/web/20000815225534/acnielson.com/products/tools/shelfbuilder/ and Item V below. Downloaded May 10, 2009, total pp.=3.*

Shelf Builder Brochure, downloaded from http://web.archive.org/web/20000817230738/acnielsen.com/download/pdf/brochure/shelfbuilder.pdf on May 10, 2009. Total pp.=1.*

NPL__SPACEMAN, Compilation of Announcement, downloaded on May 9, 2009, 2 pages from http://www.thefreelibrary.com/__/print/PrintArticle.aspx?id=54262974 and SPACEMAN Professional Brochure, 6 pages, downloaded from http://web.archive.org/web/20030630111507/acnielsen.com/download/pdf/brochure/spacemanpro.pdf and Item X below.*

Spaceman Store Suite, 1 page downloaded from http://web.archive.org/web/20000818193729/www.acnielsen.com/downloadpdf/sales/spacemanstoresuite.pdf and SPACEMAN Profession FAQ downloaded from http://web.archive.org/web/20020912185520/acnielsen.com/products/tools/spaceman/profaq.htm, 4 pages and SPACEMAN Professional v3.0. 24 pages, downloaded on May 9, 2009 from http://web.archive.org/web/20060321132733/www.acnielsen.com/download/pdf/guides/spacemanpro.pdf.*

NPL__Shelf__Builder, Compilation of Announcement, downloaded from http://connection.ebscohost.com/contentarticle/1031301849.html?view=print and Shelf Builder, downloaded from http://web.archive.org/web/20000815225534/acnielson.com/products/tools/shelfbuilder/ and Item V below. Downloaded May 10, 2009, total pages=3. Dated Aug. 15, 2000.*

Shelf Builder Brochure, downloaded from http://web.archive.org/web/20000817230738/acnielsen.com/download/pdf/brochure/shelfbuilder.pdf on May 10, 2009. Total pages=1. Dated Aug. 15, 2000.*

NPL__SPACEMAN, Compilation of Announcement, downloaded on May 9, 2009, 2 pages from http://www.thefreelibrary.com/__/print/PrintArticle.aspx?id=54262974 and SPACEMAN Professional Brochure, 6 pages downloaded from http://web.archive.org/web/20030630111507/acnielsen.com/download/pdf/brochure/spacemanpro.pdf and Item X below. Dated Mar. 31, 1999.*

SPACEMAN Store Suite, 1 page downloaded from http://web.archive.org/web/20000818193729/www.acnielsen.com/download/pdf/sales/spacemanstoresuite.pdf and SPACEMAN Professional FAQ downloaded from http://web.archive.org/20020912185520/acnielsen.com/products/tools/spaceman/profaq.htm, 4 pages, Dated Mar. 31, 1999.*

SPACEMAN Professional v3.0 (appended to Item X above on p. 1), 24 pages, downloaded on May 9, 2009 from http://web.archive.org/web/20060321132733/www.acnielsen.com/download/pdf/guides/spacemanpro.pdf. Dated Mar. 31, 1999.*

* cited by examiner

PEGBOARD STOCKING AND RESETTING SYSTEM

FIELD OF THE INVENTION

The invention relates to the process of stocking and reorganizing products that are displayed on pegboards, shelves and similar fixtures.

BACKGROUND OF THE INVENTION

The process of organizing a pegboard or other similar fixture involves placing each peg fixture in a correct location (by row and column of holes) in a back plane, and then placing each product on the correct peg fixture. This is a difficult and time-consuming process. In a typical retail environment—a grocery or pharmacy store—employees accomplish this process by trial and error, memory, or guide sheets. They are guided by experience, familiarity with the general arrangement, and by print-outs of schematic stocking plans (known as "planograms").

The Retail industry is applying more and more technology to in-store operations with the goal of reducing costs. Retailers try to improve efficiency of in-store labor and ensure that decisions made centrally are correctly executed in their stores. This becomes more difficult as the numbers of stores controlled by a retailer rises. Achieving significant increases in worker productivity affords great cost savings that are directly measurable, and improving the effectiveness of strategy execution in the store yields further indirect savings and improvements in revenue.

SUMMARY OF THE INVENTION

The invention allows a retailer to address both efficiency and execution by providing a highly effective system for indicating the precise location and identity of each item to be placed on a pegboard, and allows shelving and peg areas to be mixed. These strips support new, remodel, reset, and partial reset of peg areas because the strips are narrow enough to be applied even with some items already present. Each item's location is identified by peg-hole indicators that show where the hooks or feet on the peg fixture should be inserted. Also the location of the hole in the product may be shown to indicate where the peg shaft needs to be located. Alternatively, the top and left-right position of the item location may be shown and an actual item product package may then be put in place to determine where the peg needs to be to achieve the desired item location.

These indicators are enclosed within a rectangle or other delimiter that indicates the width of the item. The description of the item includes a full-color or a monochrome image of the actual product or no image if none is desired or available. The description also includes a textual description (product name), size, the product's UPC number and/or retailer's internal product identification number (stocking code), a barcode symbol that encodes either the UPC or retailer's stock code, and other information that may assist the process of correctly stocking the section, such as case quantity, reorder print.

The invention produces "stocking strips" that are attached to a pegboard back plane, slotted wall or other peg mounting fixture. The stocking strips contain location information, such as store number, zone identifier in the store, aisle/gondola number, side, bay and shelf numbers, and/or planogram identifier. To that end, the stocking strips may contain any information that helps store personnel in arranging and stocking or information for helping a consumer.

The stocking strips may be made of paper, plastic, woven fiber materials and the like, and may also be made of any material which can be printed on, and preferably used with a printer at a retail location.

The invention also includes a computer system that accepts data in the form of electronic planogram files describing the desired layout of the retailer's stocking sections, and a label printing system for rendering the planogram data in a form of long labels or "stocking strips" for attachment to pegboard fixtures in the store. Furthermore, the invention includes a strip layout or template system that allows the appearance of the stocking strips to be easily and rapidly customized to meet the specific requirements of the user.

An end product of the invention is a stocking strip (or set of strips) that is generated from a specific input data file (planogram). A strip may be manufactured of paper, plastic, or other material that may or may not be coated on the back with an adhesive that allows temporary placement or an adhesive that allows a semi-permanent or permanent placement. For adhesive coated strips, in general, a liner is used to cover the adhesive prior to application. In this regards, the liner may be longitudinally slit in the middle (and/or may include slits from at predetermined locations) so that part of the liner may be removed while leaving the rest undisturbed. Adhesives used for temporary strip placement are preferably formulated to ensure good adhesion to the fixture, but leave no adhesive residue when the strip is later removed from the fixture. When strips are not adhesive coated they may be fitted into the pricing channels used by some retailers, attached to the pegboard with temporary pegs, magnets or clips, or taped or glued into position.

The strips may be printed on the front with the information described above (and/or, depending upon the type of printer used, have information printed on the back). In addition, strips may be printed with positioning information that is used to correctly position other strips. Each strip is cut to a length appropriate to a width of a fixture to which it is to be applied. This is preferably done dynamically by a computer-controlled cutter during the print process.

Strips may be delivered as either individual strips or pages of one, two, three, four or more strips. Strips delivered in pages are manufactured using a "cut and tie" technique such that adjacent strips are attached by narrow "ties" (e.g., perforations) that hold them together during printing and handling but allow easy separation when desired, or use "perfed" paper folded sheets that are cut or can be cut or torn to the actual shelf width.

The strips may be from one quarter of an inch high to 4 or more inches high depending on the application. In addition, the length of the strips may be from just a few inches, for setting small peg areas, three or four feet for setting the most common store peg areas, to many feet long to support setting a continuous peg wall area.

Still further, strips may be used for shelving that is intermixed with a pegboard(s) and accompanying product. To that end, vertical strips may show peg rows and/or shelf locations.

In one example of the present invention, a user unpacks the strips and locates any vertical strips included therein. The user may then remove the backing from the vertical strips and stick them along the left edge (for example) of a pegboard from bottom to top, and top to bottom, starting at the first row of peg holes. There may be a single vertical strip or multiple vertical strips depending on the printer used, the height of the pegboard and other factors. The user then locates the proper horizontal strips, removes the backing, and by matching up the indicators on the horizontal strips with the indicators on the vertical strips, sticks the horizontal strips into place at each location indicated on the vertical strip. The indicators may be colors or text or symbols that can be matched up to place the horizontal strip correctly. The user then places the pegs on the pegboard as indicated. Once the pegs are in place, the user may remove the strips or leave then in place, depending on whether they are needed to install products on the pegs, or if they will be used as permanent strips kept on the pegboard to show the stocking plan.

Accordingly, in one embodiment of the present invention, a stocking strip for pegboard stocking includes a strip for locating a product or plurality of products on a peg board display, the strip including a product identifier and a peg indicator for locating the pegs on the pegboard display.

In another embodiment of the present invention, a pegboard organization system for locating product on a pegboard display includes a plurality of stocking strips where each stocking strip includes a strip for locating a product on a peg board display, the strip being positioned on the pegboard display in a predetermined manner and includes a product identifier and a peg indicator for locating the peg on the pegboard display.

In another embodiment of the present invention, a stocking strip for pegboard stocking includes an elongated strip containing information for locating a plurality of different products on a peg board display, a first identification number for identifying the strip, a first text area for identifying a source planogram or print job, a second text area for listing stocking location in a sales establishment which contains the pegboard display, a third text area for listing a height for the product, a demarcation for indicating a span of the position of the product on the pegboard, a product image, a product identifier, a color marker and a peg indicator for locating the peg on the pegboard display.

In another embodiment of the present invention, a method for locating product on a pegboard display includes providing a pegboard for displaying product, and positioning a stocking strip comprising a strip for locating a product on the peg board display, the strip including a product identifier and a peg indicator for locating the peg on the pegboard display.

In another embodiment of the present invention, a method for locating product on a pegboard display includes providing a pegboard for displaying product, positioning a first vertical stocking strip comprising a strip for locating a plurality of substantially horizontal stocking strips for locating product on the peg board display, the strip including positioning markers for positioning the horizontal strips and positioning the plurality of substantially horizontal stocking strips on the pegboard display substantially in accordance with the positioning markers. The horizontal strips each comprise a strip for locating at least one product on the peg board display and each strip includes a product identifier and a peg indicator for locating the peg on the pegboard display.

In another embodiment of the invention, a method for locating product on a pegboard display includes positioning a substantially horizontal stocking strip on a pegboard display, where the horizontal strips each comprise a strip for locating at least one product on the peg board display and each strip includes a product identifier and a peg indicator for locating the peg on the pegboard display. The method also includes positioning a peg shaft in accordance with the peg indicator and positioning product on the peg shaft.

In yet another embodiment according to the present invention, a method for manufacturing a stocking strip for locating product on a pegboard display using a computer system, the stocking strip including a product identifier and a peg indicator for locating the peg on the pegboard display, the method including inputting a set of planogram data records into the computer, the planogram data records including data comprising information related to products and fixtures for the pegboard display, inputting product images, inputting a stocking location or physical layout of a sales establishment in which the pegboard display will be provided, and approving a predetermined arrangement of product information to be printed on a stocking strip. The information related to the arranged products is obtained from the planogram data and/or product images. The method also includes printing the stocking strip.

In still yet another embodiment of the present invention, a system for manufacturing a stocking strip for locating product on a pegboard display is provided where the stocking strip includes a product identifier and a peg indicator for locating the peg on the pegboard display. The system includes inputting means for inputting product data for producing the stocking strips, specifying means for specifying an arrangement of product information to be printed on a stocking strip, wherein the product information is obtained from the planogram data and/or product images, and printing means for printing the stocking strip according to the specified arrangement.

In yet another embodiment according to the present invention, a method for manufacturing a stocking strip for locating product on a pegboard display, the stocking strip including a product identifier and a peg indicator for locating the peg on the pegboard display, where the method includes inputting product data for producing the stocking strips, and specifying an arrangement of product information to be printed on a stocking strip. The product information is obtained from the planogram data and/or product images. The method also includes printing the stocking strip according to the specified arrangement.

Other embodiments of the present invention include computer readable media embodiments and computer application program embodiments for performing the methods recited in the above embodiments.

Figure 1:
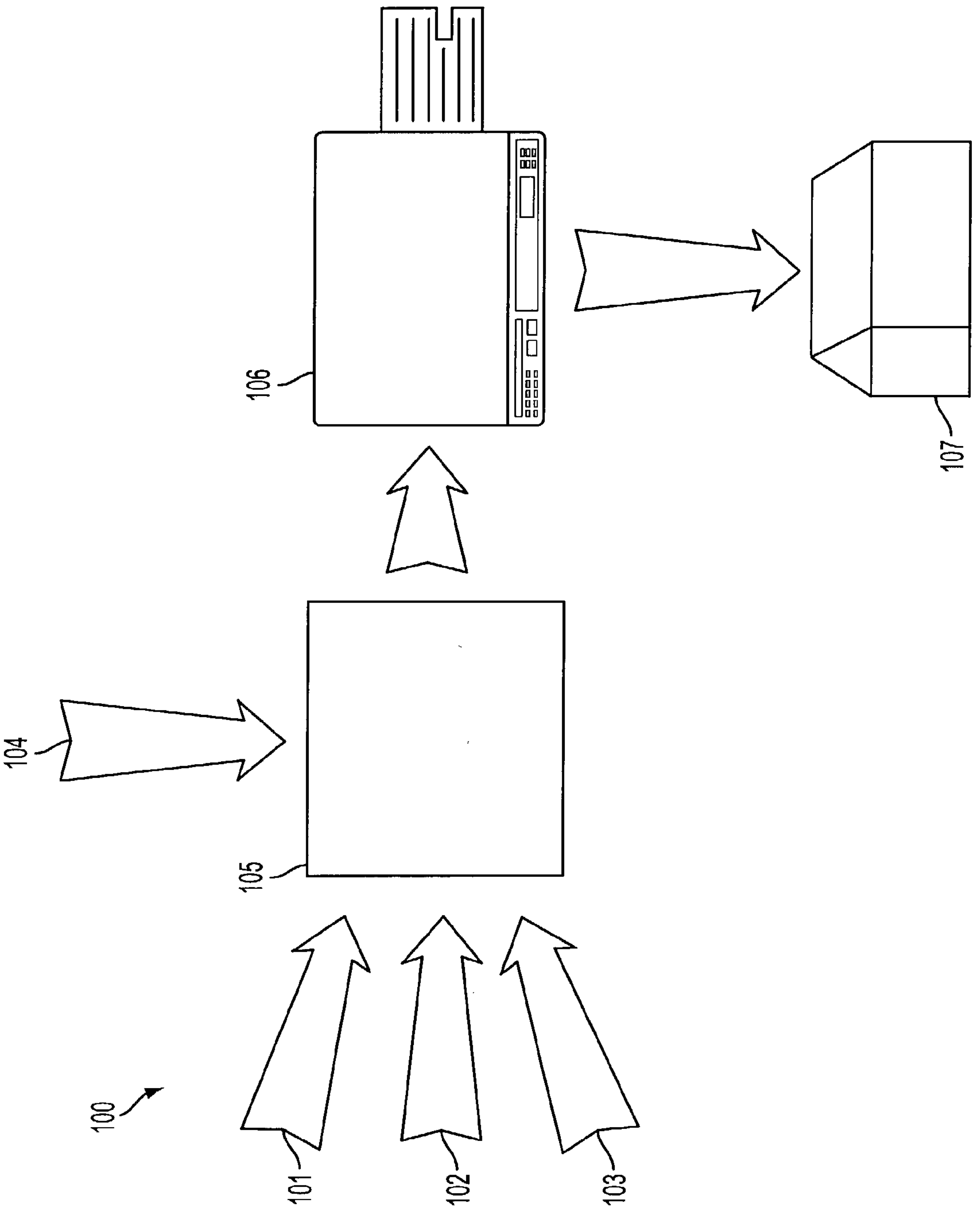
FIG. 1 is a flow diagram of the Pegboard Stocking and Resetting System according to an embodiment of the present invention.

Before the embodiments of the invention are explained in detail, it is to be understood that the invention is not limited to the details of construction and arrangement of components set forth in the following description or illustrated in the drawings. The invention is capable of other embodiments and of being practiced or being carried out in various ways. Also it is to be understood that the phraseology and terminology used herein is for the purpose of description and should not be regarded as limiting.

DETAILED DESCRIPTION OF THE PREFERRED EMBODIMENT

Referring now to the drawings, there is shown in FIG. 1. a pegboard stocking and resetting system 100 embodying the present invention. The pegboard stocking and resetting system 100 is particularly useful for retail operations such as grocery, pet, hardware and pharmacy stores, and will be described in that environment. However, one skilled in the art will appreciate that the pegboard stocking and resetting system 100 is applicable for other applications such as wholesale locations, warehouse inventory control and the like, in which similar issues of planning, stocking and re-organizing a large inventory of products arise.

The pegboard stocking and resetting system 100 manages point-of-purchase product merchandizing fixtures such as shelves and pegboard assemblies by providing information on the type, quantity and location of goods to be arranged on the fixtures using one or more product organization strips. By deriving this information directly from source data and presenting it in a large format in close proximity to the work area, in-store personnel are able to work much more efficiently. Visual cues such as the characteristic colors and shapes in a product image place on the strip further speed the process of product selection and positioning.

The pegboard stocking and resetting system 100 preferably uses, as its principal input, a set of planogram data records 101 that describe the products and fixtures for a section of the store. These data records may be produced by the retailer's planning staff using industry-standard software packages designed for this purpose (such as, for example, SPACEMAN™ from AC Nielsen, APOLLO™ from Information Resources Inc. and PRO/SPACE™ from JDA Software). The input data may also be in a variety of other organizations such as relational database records, character-delimited data files, fixed-field-length data files and the like.

Accordingly, the strips are produced using software which implements the processes described herein on a computer (e.g., personal computer, workstation etc.), which includes a printer or output device for producing the strips. Input of information may be accomplished, of course, via diskette, hard drive, over a network (LAN, WAN, intranet, internet), keyboard, scanner, fax and the like.

A library of product images or other product-related information 102 (e.g., product images) may be made available for the strips, if required, by the user. The system may also accept store physical layout (planogram locations) 103 if the end user of the strips requires the strips to show the precise location of the fixture in the store.

The user of the strips specifies or approves a customized strip layout template that controls the type of data shown on the strip, as well as its format and presentation (colors, fonts etc). This individualized template layout 104 may also be input to the process. These data streams feed into the Strip Printing Software 105 operated on, for example, a personal computer/workstation, and result in the generation of strips via a printer 106. The strip printer 106 outputs the strips cut to appropriate length, or alternatively spools the strips in a continuous roll, the strips then cut apart when used. The strips may be produced at a central location (or locations) and packaged and shipped to the point of use, typically a retail location 107; alternatively they may be produced at the point of use by transmitting the electronic files to a local printer or an in-facility printing device.

Figure 2A:
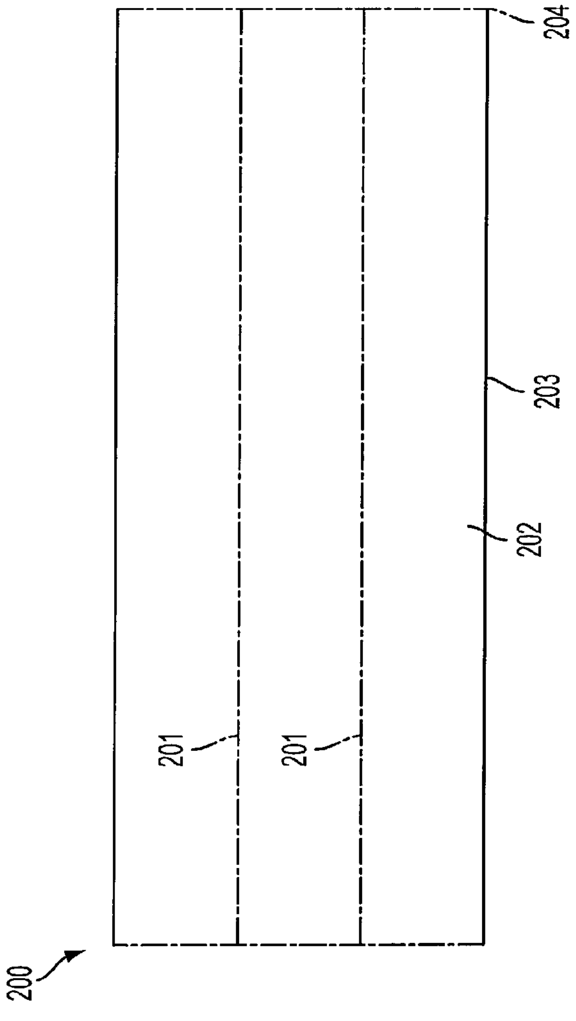
FIG. 2A is a front view of a diagram illustrating the physical features of a stocking strip according to an embodiment of the present invention.
Figure 2B:
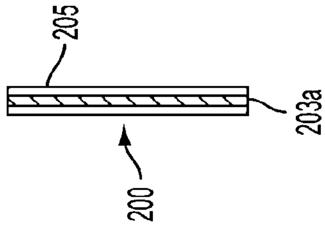
FIG. 2B is a side view of a diagram illustrating the physical features of a stocking strip according to an embodiment of the present invention.

Referring to FIGS. 2A and 2B, the physical features of a stocking strip 200 are described. The strips are produced either one at a time or in sheets where two, three, four or more strips are produced at once in a single page. FIG. 2 shows a sheet in which one page yields three strips. The strips are held together via a longitudinal "cut and tie" perforations 201 that provide strength during processing and ease of separation at the point of use. The print surface 202 may be plain (uncoated), or coated to facilitate thermal transfer or direct thermal printing processes. The rear surface of the strip may be plain, or coated with an adhesive 203 (FIG. 2B) to attach the strip to the fixture. The adhesive on the rear surface may be permanent or a low-residue removable adhesive. If present, the adhesive is protected by a liner sheet 205. The liner sheet 205 may be longitudinally slit, allowing part or all of the liner to be removed depending upon the amount of adhesive the user wishes to expose. Alternatively, the strips can be produced in a large sheet and cut apart before use.

Figure 3:
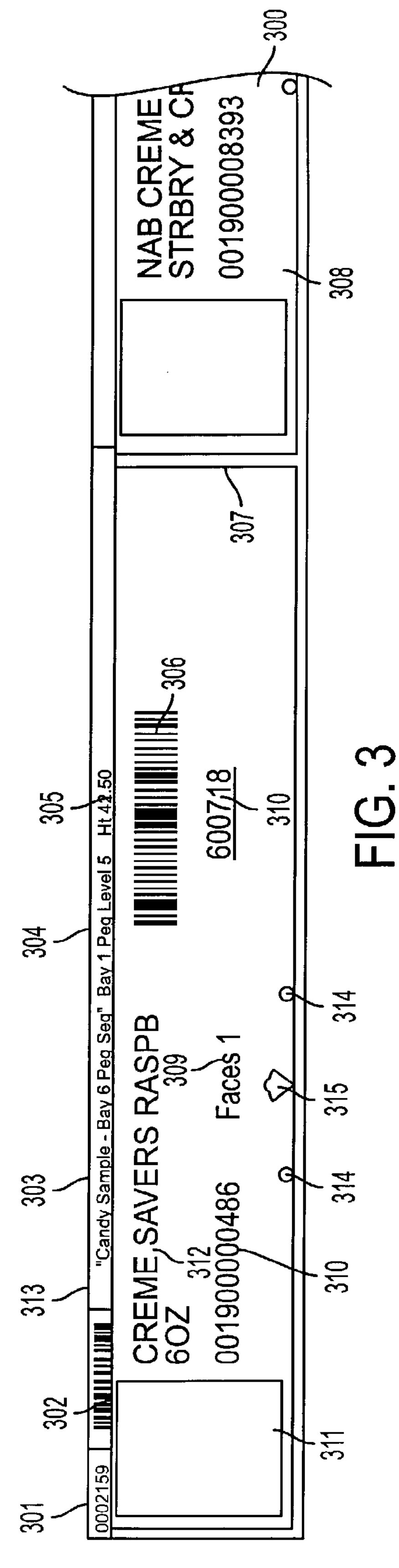
FIG. 3 is a diagram illustrating an example of a general appearance of a horizontal stocking strip according to an embodiment of the present invention (actual appearance may be customized to a user's individual needs).

Referring to FIG. 3, the general appearance of a horizontal stocking strip may be reviewed. This figure shows only a part of a strip, but illustrates many of the patentable features. Note that the specific data elements shown are examples only, and do not imply any fixed design, format or domain of information.

Accordingly, each strip generally includes a serial number 301 that uniquely identifies it to the user. The serial number 301 may also be rendered as a barcode 302 to facilitate auditing of the strips. The top margin of the strip includes text 303 which identifies the source planogram and/or print job; this information may also be located in any area of the strip, including the back of the strip. Also shown in the top margin is the strip posting location 304 (which illustrates where the strip is placed). This location may be relative to the stocking section, for example "Segment 3 Shelf 2", or may contain an absolute location that positions the strip precisely in the store (for example, "Store 1234 Aisle 3 Left Side Segment 23 Shelf 5"). Note that the strip may also be configured to place the information shown here in the top margin, at the left edge of the strip. Additionally, the strip may also include the height of the fixture above the ground 305 to assist installation of fixtures. Alternatively the elements 301-305 can be placed to one end of the strip, or on the back of the strip.

Peg indicators may be placed on the strip to indicate locations of pegs for various product. These indicators may show a peg being located, for example, "two holes down" or "one hole up".

Each product position may also include demarcations 307 that show the lateral extent of the product and indicates the border between this product and the next product 308. The demarcation may be via a rectangle, colored box, or other visual cue.

Within the product position, a wide range of information may be displayed on the strip. This includes a product image 311, product identifiers 310 (such as LPC and/or the retailer's internal stocking code), number of units to be placed on shelf 309 and the like. The strip may also display barcodes 306 in a variety of symbologies such as UPC-A, 3 of 9, or others as specified by the retailer.

The horizontal strip may also include a number of additional pegboard related features. For example, the initial part of the top margin may be marked with a distinctive symbol or color bar 313. The color of the color bar 313 on each strip may vary within a single segment. For example, the color bar 313 for shelf 1 may be red, that for shelf 2 may be orange, that for shelf 3 may be yellow, etc. Colors are preferably not repeated within a single segment. The color bar 313 serves two purposes: firstly, it clearly identifies the strip as a horizontal peg strip. Secondly, the user may match it to a color bar 407 on a corresponding vertical peg strip 400 to determine where the horizontal strip 300 is to be placed (see FIG. 5). Referring again to FIG. 3, each pegboard product position contains indicators showing the position of the peg for the product. The left and right peg foot indicators 314 show the peg holes into which the peg feet, or hooks, are to be inserted. The peg shaft location indicator 315 shows the location of the peg shaft. FIG. 3 shows one possible representation of peg location, however the invention is capable of rendering a variety of different peg location indicators, driven by an internal database that profiles peg physical dimensions and characteristics. The system selects the correct peg profile for a product position based upon information in the planogram, store mapping or other information associating the planogram with the peg types to be used. The peg location indicators may also show a number of rows down or up for the product location. FIG. 6A illustrates an example of a positioned horizontal strip according to an embodiment of the present invention.

Figure 4:
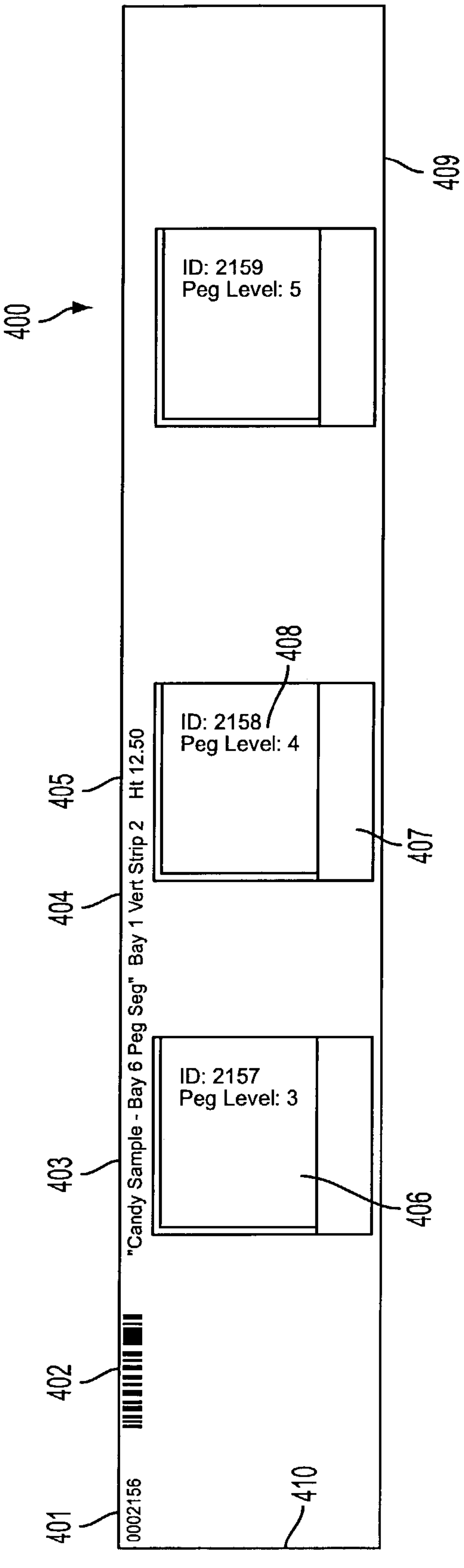
FIG. 4 is a diagram illustrating an example of a general appearance of a vertical (positioning) stocking strip according to an embodiment of the present invention (actual appearance may be customized to a user's individual needs).
Figure 6A:
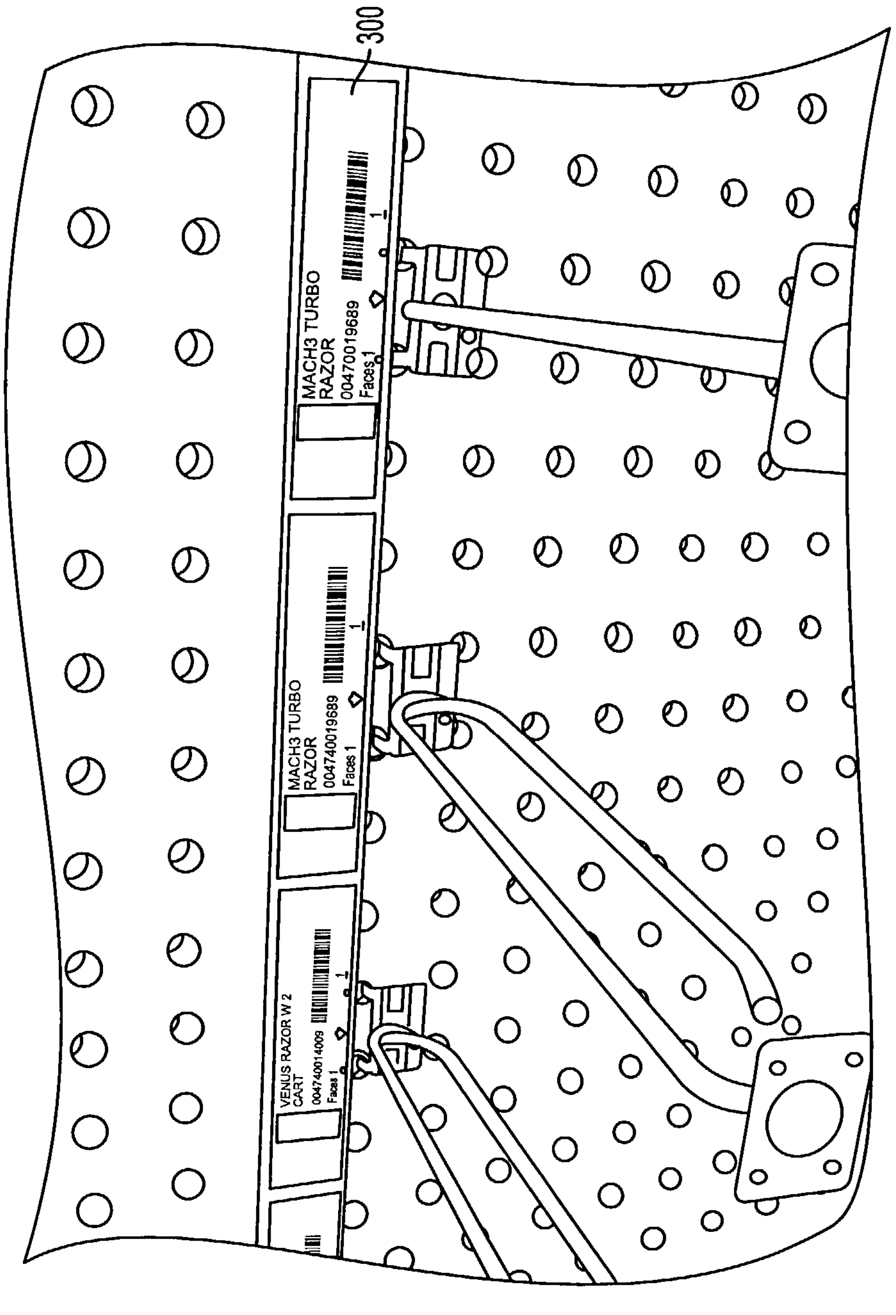
FIG. 6A illustrates a horizontal peg location system according to an embodiment of the present invention.
Figure 6B:
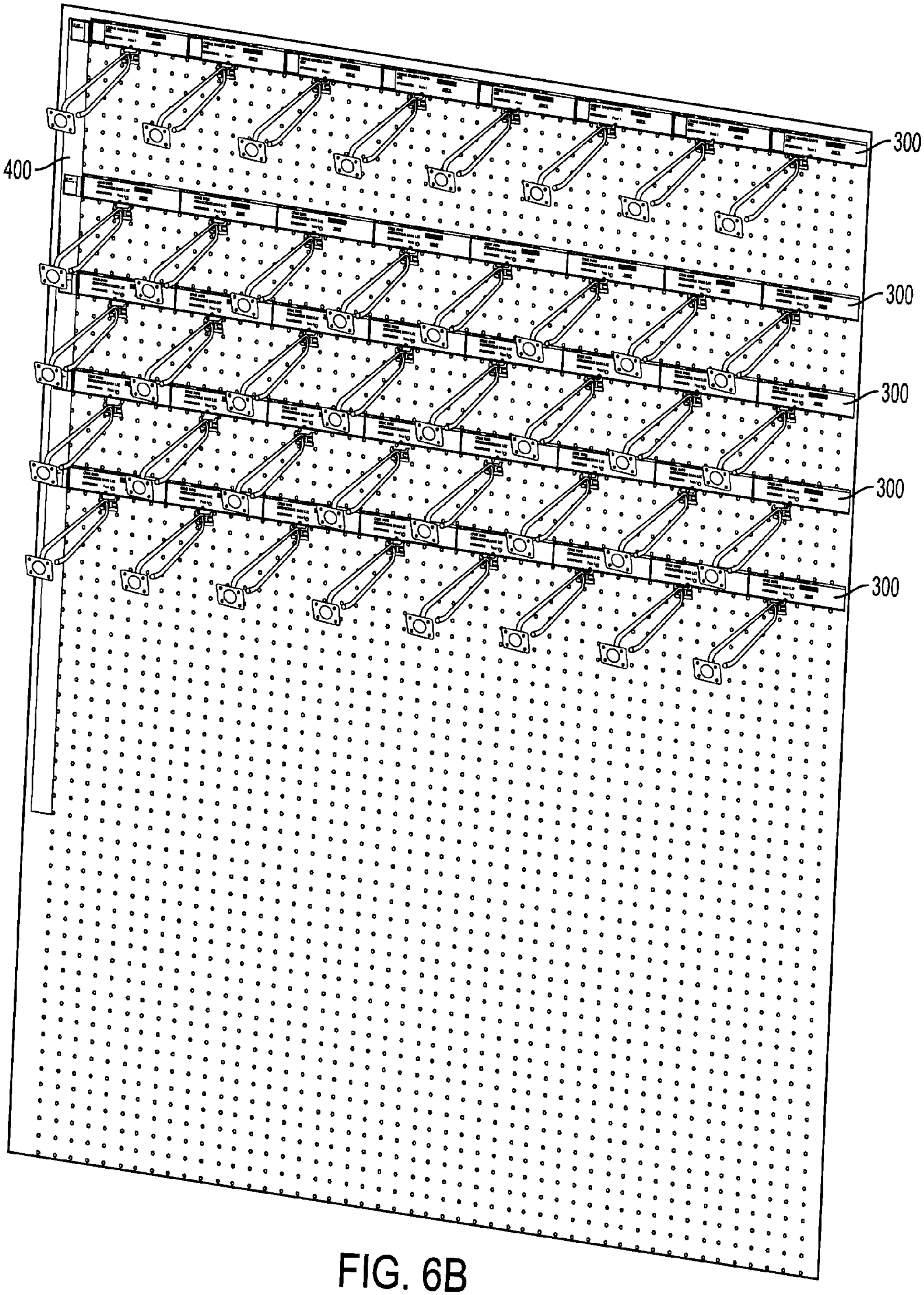
FIG. 6B illustrates a vertical and horizontal peg location system according to an embodiment of the present invention.

FIG. 4 illustrates the general appearance of a vertical peg stocking strip 400 according to the present invention. Features 401 through 405 on this strip are similar to the corresponding features of the horizontal peg stocking strip, such that the vertical strip may include a strip serial number 401, a strip barcode 402, print job and/or source planogram 403, location of strip relative to stocking section/store information 404, and strip height indication information 405. The vertical peg stocking strip 400 may be attached to the left edge of a segment of pegboard, so that its bottom edge preferably aligns with the leftmost column of holes in the pegboard. The left edge of the strip 410 may be placed at the bottom of the pegboard, aligned with the lowest row of peg holes. When placed in position, the horizontal strip positions 406 on the vertical peg strip 400 generally show the precise locations of the corresponding horizontal peg strips 300. The horizontal strip positions 406 contain various features that assist in identifying the corresponding horizontal peg strip 300. Firstly, there is a color bar 407 that is the same color as the color bar 313 on the horizontal peg strip 300. This provides an immediate visual cue to the user. In addition, the horizontal strip position 406 contains the serial number and level number 408 of the horizontal peg strip, and bottom edge 409 aligns with the leftmost columns of holes. FIG. 6B illustrates an exemplary arrangement of a pegboard using a vertical and horizontal pegboard strip system according to one embodiment of the present invention.

Figure 5:
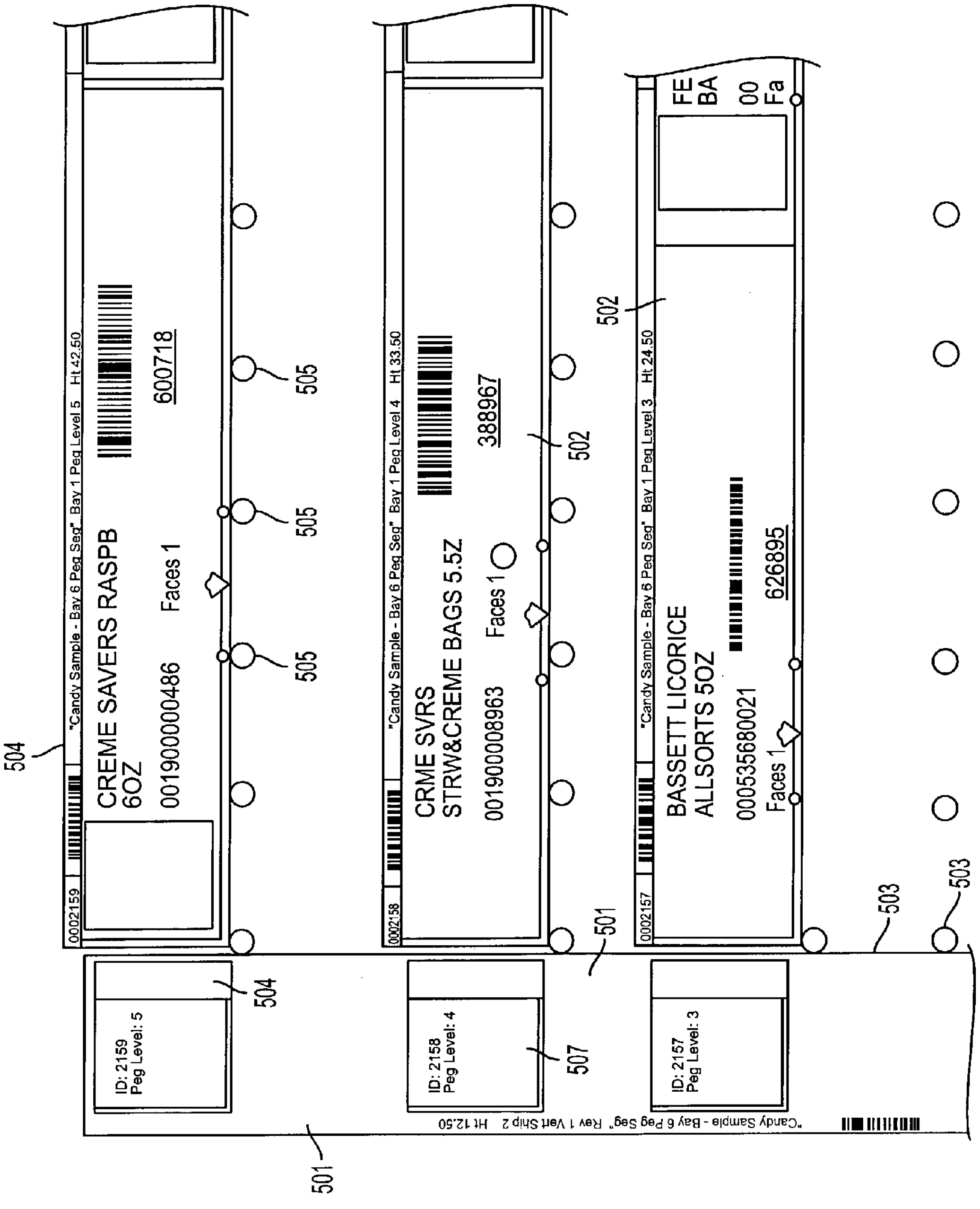
FIG. 5 is a diagram illustrating how a set of vertical and horizontal strips according to an embodiment of the present invention are arranged on a pegboard back plane at a point of use.

FIG. 5 illustrates a vertical peg strip and corresponding horizontal peg strips positioned at the point of use. The vertical peg strip 501 is attached to the left edge of the segment of pegboard, so that the bottom edge of the vertical peg strip 501 aligns with the leftmost column of holes in the pegboard 503. The assembly of the vertical and horizontal strips is made very quick and easy by the visual cues provided by the color bars, the strip serial number and level number 504. Each horizontal peg strip 502 is placed with its left edge against the bottom edge of the vertical peg strip 501, preferably dictated by the corresponding strip position box 507. The invention may also be configured to produce vertical peg strips that are to be positioned on the right side, middle, or internal area of the pegboard section, and that are used instead of, or in addition to, the left vertical strip.

After the vertical and horizontal peg strips are mounted on the pegboard fixture, the in-store worker may now quickly and easily insert peg fittings in the pegboard at the correct indicated locations. Next, the products for the pegboard can be rapidly stocked at their designated locations, this process being facilitated by the product descriptions, color images, and product UPCs shown on the strip. Finally, the strips may be removed, if desired, or left in place to aid restocking.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto.

What is claimed is:

1. A pegboard organization system for locating at least four products on a pegboard display, wherein each product among the at least four products is positioned according to a respective peg, the respective peg comprising at least one peg shaft for holding a product and at least one peg foot for coupling the peg to the pegboard display, the system comprising:

a first strip comprising at least two first color bars, the first strip configured to be positioned in a first direction; and at least two second strips for positioning the at least four products, wherein each second strip is configured to be positioned in a second direction different from the first direction, and wherein each second strip is configured to position at least two products among the at least four products, each second strip comprising:

a second color bar, and for each product positioned by each second strip:

a product identifier for identifying the product, and a peg indicator for indicating a position of the respective peg on the pegboard display at which the respective peg is to be positioned, wherein the peg indicator comprises at least one first marker for indicating a position of the at least one peg shaft on the pegboard display such that a location for the product identified by the product identifier is indicated by the at least one first marker, wherein each first color bar respectively indicates a position of each second strip, wherein each first color bar is configured to respectively correspond to the second color bar on each second strip.

2. The system according to claim 1, wherein the first stocking strip further comprises a height indicator that indicates a height of the first stocking strip on the pegboard display.

3. The system according to claim 1, wherein the peg indicator comprises a printed marker for indicating a position of the peg on the pegboard display.

4. The system according to claim 3, wherein the peg indicator further comprises at least one marker for indicating a position of a foot of the peg.

5. The system according to claim 1, wherein the first stocking strip further comprises a location information area for printing thereon information indicating a location of the pegboard display in a sales establishment.

6. The system according to claim 1, wherein the first stocking strip further comprises a strip identification number for distinguishing the first stocking strip from other stocking strips.

7. The system according to claim 6, wherein the strip identification number comprises information related to a source planogram, wherein the source planogram indicates the position of the first stocking strip on the pegboard display.

8. The system according to claim 6, wherein the strip identification number comprises information identifying a print job related to the printing of the first stocking strip.

9. The system according to claim 6, wherein the strip identification number comprises a bar code for identifying the first stocking strip.

10. The system according to claim 1, wherein the product identifier comprises text identifying the product which is to be located on the peg to which the peg indicator corresponds.

11. The system according to claim 10, wherein the text comprises a name of the product or a logo of the product.

12. The system according to claim 1, wherein the product identifier comprises an image related to the product.

13. The system according to claim 12, wherein the image comprises a photo of the product.

14. The system according to claim 12, wherein the image comprises a logo of the product or manufacturer of the product.

15. The system according to claim 1, wherein the product identifier comprises a bar code for identifying the product.

16. The system according to claim 1, wherein the first stocking strip further comprises information regarding a number of units of the product to be placed on the peg.

17. The system according to claim 1, further comprising a row indicator indicating a row of the pegboard display on which the first stocking strip is placed.

* * * * *